Figure 1:
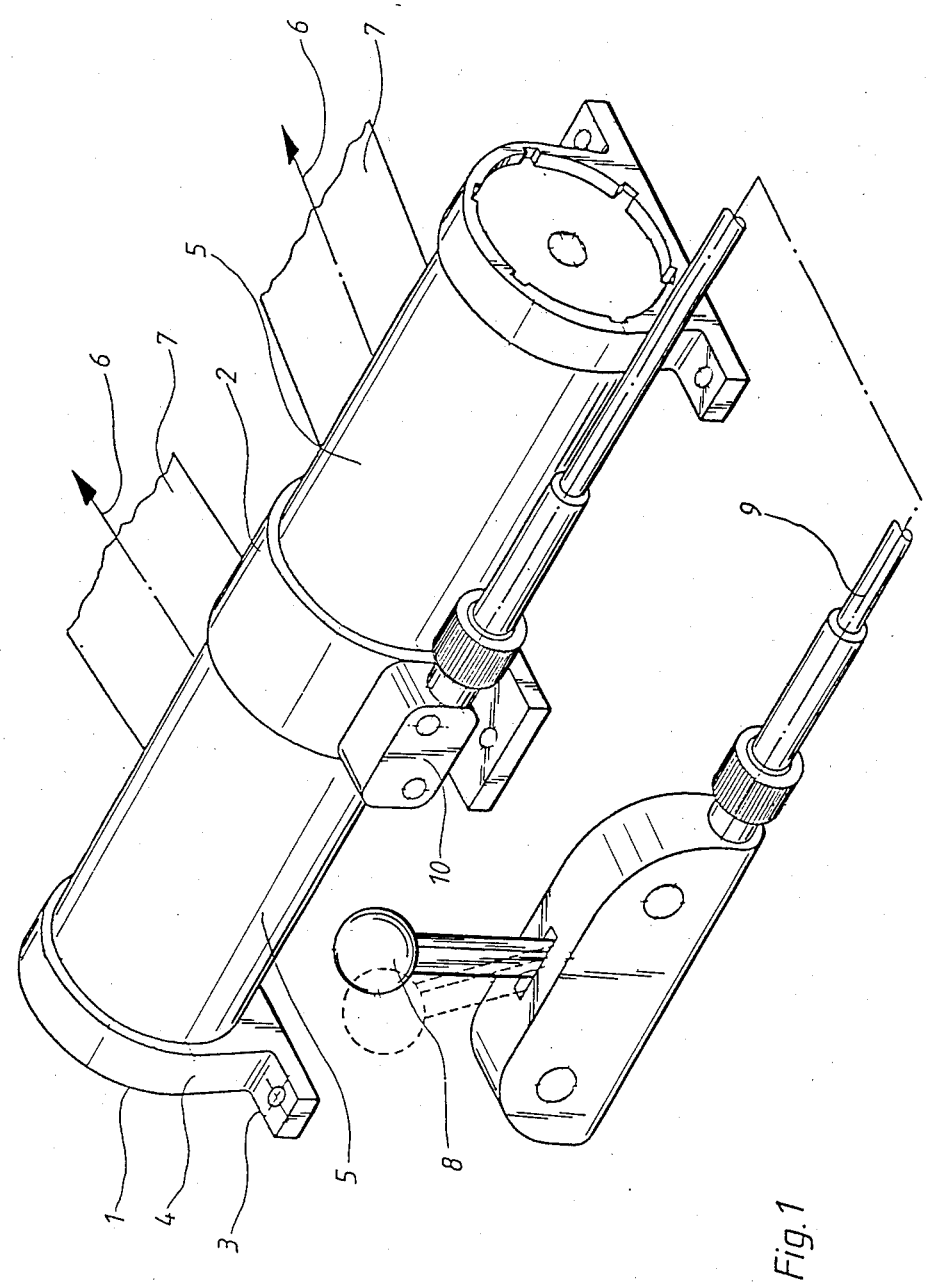

United States Patent [19]

Nöhren et al.

[11] Patent Number: 4,629,142
[45] Date of Patent: Dec. 16, 1986

[54] SAFETY BELT WINDING DEVICE

[75] Inventors: Hubert Nöhren; Helmut Knofe; Klaus Struck, all of Hamburg, Fed. Rep. of Germany

[73] Assignee: Autoflug GmbH, Rellingen, Fed. Rep. of Germany

[21] Appl. No.: 733,682

[22] Filed: May 13, 1985

[30] Foreign Application Priority Data

May 16, 1984 [DE] Fed. Rep. of Germany ....... 3418185

[51] Int. Cl.$^4$ .............................................. B60R 22/38
[52] U.S. Cl. .............................................. 242/107.4 B
[58] Field of Search ................. 242/107.4 B, 107.4 A, 242/107.4 R; 280/806; 297/478

[56] References Cited

U.S. PATENT DOCUMENTS

| | | | |
|---|---|---|---|
| 3,058,687 | 10/1962 | Bentley | 242/107.4 B |
| 3,105,662 | 10/1963 | Wrighton | 242/107.4 B X |
| 3,315,915 | 4/1967 | Vanesse | 242/107.4 B |
| 4,244,600 | 1/1981 | Takada | 242/107.4 B |

FOREIGN PATENT DOCUMENTS

| | | |
|---|---|---|
| 1253061 | 10/1967 | Fed. Rep. of Germany . |
| 2539830 | 3/1977 | Fed. Rep. of Germany . |
| 888210 | 1/1962 | United Kingdom . |

*Primary Examiner*—John M. Jillions
*Attorney, Agent, or Firm*—Townsend and Townsend

[57] ABSTRACT

A safety belt winding device has a housing with a housing bracket in which the housing can be fitted in different angular positions centrically symmetrical to the housing axis. A transmission member, which passes out of the end face of the housing centrically symmetrically to the housing axis and with centrically symmetrical mobility is intended to receive a switching movement from an actuating member in order to actuate the locking device of the safety belt winding device. The actuating member is provided in an actuating bracket which is in turn connectable to the housing of the safety belt winding device by means of centrically symmetrical connecting means. By this means the directions of belt extension and the directions in which the actuating bracket is attached become independent mutually and of the direction of the surface to which the safety belt winding device is fastened.

11 Claims, 8 Drawing Figures

SAFETY BELT WINDING DEVICE

DESCRIPTION

The invention relates to a safety belt winding device with a housing, with a housing bracket to fasten the housing in a vehicle or craft, with a safety belt reel mounted rotatably in the housing, with a locking mechanism to lock the reel against a rotary movement relative to the housing, with a control member connected for conjoint rotation to the safety belt reel and causing the locking mechanism to lock the reel with respect to a reel rotation unwinding the belt in case of deceleration, and with a device to actuate the locking mechanism which comprises an actuating bracket mountable in any number of circumferential postions in fixed relationship to the housing, an actuating element mounted movably thereto, a transmission member cooperating with the actuating element which extends outside the housing ahd transmitting its movement 1nto the interior of the housing, and a switching member in the interior of the hous1ng movable by the transmission element, restraining the control member in one switching position and releasing the control member in another switching position.

In known safety belt winding devices of this type, which are used for pilots' seats in aircraft for example, the locking is produced on the one hand in that a predetermined acceleration limit in the extension of the belt is exceeded. For this purpose the control member is constructed as an inertia mass, which is connected by spring power to the reel and lags behind relative to the belt reel in the case of accelerated belt extension counter to the spring power, and thereby activate the locking mechanism. On the other hand, the locking in the known devices can be switched on by remote control by means of a hand lever located within the user's reach, which is connected by a bowden cable to the actuating element. The actuating bracket supporting the actuating element is mounted fixed in the vehicle near the safety belt winding device, whilst the transmission of movement to the safety belt winding device occurs by means of an angle lever for example. The transmission member, or its part which cooperates with the actuating element, is arranged eccentrically on the housing in such a way that a given installation position of the safety belt winding device relative to the actuating bracket is necessary for the cooperation. In many cases this leads to the installation position of the safety belt being determined in an undesirable manner, although unrestricted variability of the installation position of the safety belt winding device would be desirable from the standpoint of different belt extension directions. The known arrangement also has the disadvantage of more difficult assembly and maintenance, because the safety belt winding device and the actuating bracket have to be fitted in the vehicle separately and in a position requiring mutual adjustment.

The underlying object of the invention is to develop a safety belt winding device of the type initially stated which is more versatile in use and requires a smaller outlay for production, assembly and/or maintenance.

This object is achieved according to the invention when the housing and the housing bracket are mutually connected by easily changeable connecting means axially symmetrical relative to the housing axis, when the actuating bracket is mountable on the housing on the end face and the connecting means provided for this purpose are constructed exchangeably and axially symmetrically to the housing axis and when part of the transmission member which cooperates with the actuating element is constructed for a an axially symmetrical switching movement.

Even in the case of a different installation position of the safety belt winding device in its bracket, the part of the transmission member which cooperates with the actuating element remains unchanged in its position and in its switching movement direction, so that there is no need to consider these factors when attaching the actuating bracket. Unrestricted variability of the belt extension direction is achieved by this means. Because the actuating bracket is arranged on the housing itself, and is therefore also adjusted correctly relative to the housing from the outset by the construction of the connecting means, the outlay for assembly and maintenance is reduced. It is also unnecessary for different actuating brackets, housings or actuating elements to be kept in stock for different installation conditions, so that the production outlay is reduced. Lastly, where safety belt winding devices are arranged in pairs, it is possible to have the transmission members, which are placed mutually opposite in a centrically symmetrical manner, switched by one and the same actuating element, whilst the two belt winding devices are mutually independent as regards the installation position and can therefore be used with a different belt extension direction.

The housing bracket conveniently exhibits an annular part enclosing the housing, whilst the housing and the annular part are provided with catches cooperating in discrete angular positions, which permit a different installation of the housing by simple transposition and consequently different cooperation of the catches. If two safety belt winding devices are arranged juxtaposed as a pair, then a common housing bracket may be provided to accommodate the actuation-side ends of the housings.

According to a further feature of the invention, the part of the transmission member which cooperates with the actuating member is constructed for a switching movement in the axial direction, because a simple possibility of actuation by traction or compression in the axial direction results by this means. However, an axially symmetrical possibility of actuation, which is therefore not dependent on the orientation of the transmission member, is also obtained if the part of the transmission member which cooperates with the actuating member is of axially symmetrical configuration and constructed for a rotary movement about the housing axis. For example, the part of the transmission member which cooperates with the actuating member may be constructed as a pinion, whereas the actuating member is a rack. According to another exemplary embodiment the actuating member is constructed as an eccentric with a hub drilled in axially symmetrical manner (hexagonally for example), whilst the part of the actuating member which cooperates therewith has a sharp configuration fitting into the hub bore.

The actuating bracket conveniently adjoins the housing coaxially at the end face of the latter, so that the actuating element is oriented in the axial direction and can influence in this direction, preferably by its traction or compression, the transmission member which is movable in the same direction. In another advantageous embodiment the actuating bracket adjoins the actuationside housing end face (or end faces in the case of a paired arrangement) radially, in which case the actuating element is then generally likewise oriented radially.

The actuating bracket may be combined structurally with housing parts, for example with the housing end wall. Likewise a combination or connection of the actuating bracket with or to the housing bracket is possible. This applies particularly in those cases where a conjoint housing bracket is provided for the actuation-side ends of two paired housings.

In a preferred embodiment of the invention the radially arranged actuating element is constructed for a spreading movement in front of the transmission member displaced out of the housing by spring power. The transmission member is forced into the housing by the spreading. This embodiment is particularly advantageous in the case of the paired arrangement of two safety belt winding devices, if the actuating element is located between the transmission members, located mutually opposite, of the two housings.

If the actuating element is constructed for axial actuation, it may be convenient if the transmission member is forced into the housing by spring power and the actuating member is constructed to exert a tractive movement.

It is conveniently provided, for the cooperation of the switching member with the control member, that the switching member exhibits a catch projection and the control member exhibits elevations and recesses cooperating with the latter, into which the catch projection engages in the switching position directed towards blocking of the device. Such positive cooperation is not in fact necessary, because it is only necessary to exert upon the control member a torque counter to the unwinding direction of such magnitude that it is restrained counter to the spring power which tends to entrain it with the reel, sufficiently for the control function; however, the positive engagement is to be preferred for the sake of certainty of function. In the interests of this certainty, the flank of the elevation of the control member which points in the unwinding direction can be constructed steep, so that any accidental jumping of the control member over the elevation is eliminated. It is further convenient in this case if the switching member is yielding in the unwinding direction counter to a resistance, the torque of which is greater than the torque required for the actuation of the control member. This resistance is conveniently formed by a brake or slip coupling, which can be located within the switching member or in the connection of the switching member to the transmission member or also elsewhere. Such a brake or slip coupling may also be replaced by a resilient yieldingness of the switching member, because the maximum angle of relative rotation to be expected of the switching member after the engagement is generally small.

According to a further feature of the invention, the elevations of the control member may have a flat flank pointing counter to the unwinding direction, whilst the switching member is axially resiliently yielding. A reverse rotation of the reel in order to wind in the belt is thereby permitted even if locking is switched on permanently. This of course presupposes that the torque exerted by the switching member via the flatly inclined flank of the control member is smaller than the spring power causing the reverse rotation.

A preferred embodiment of the switching member exhibits a plurality of—preferably two—spring arms distributed over the circumference to form catch projections cooperating with the control member.

Figure 2:
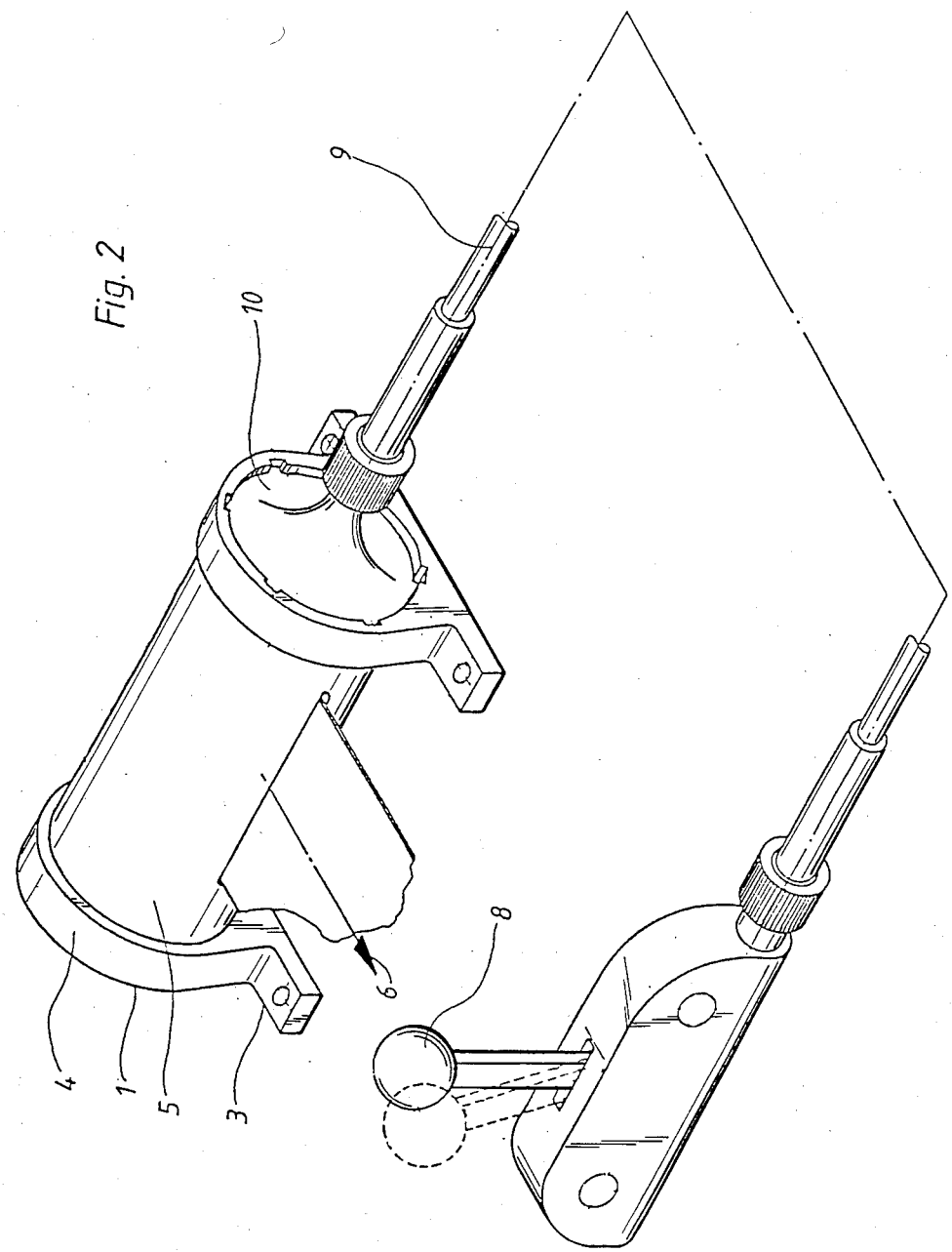
Figure 3:
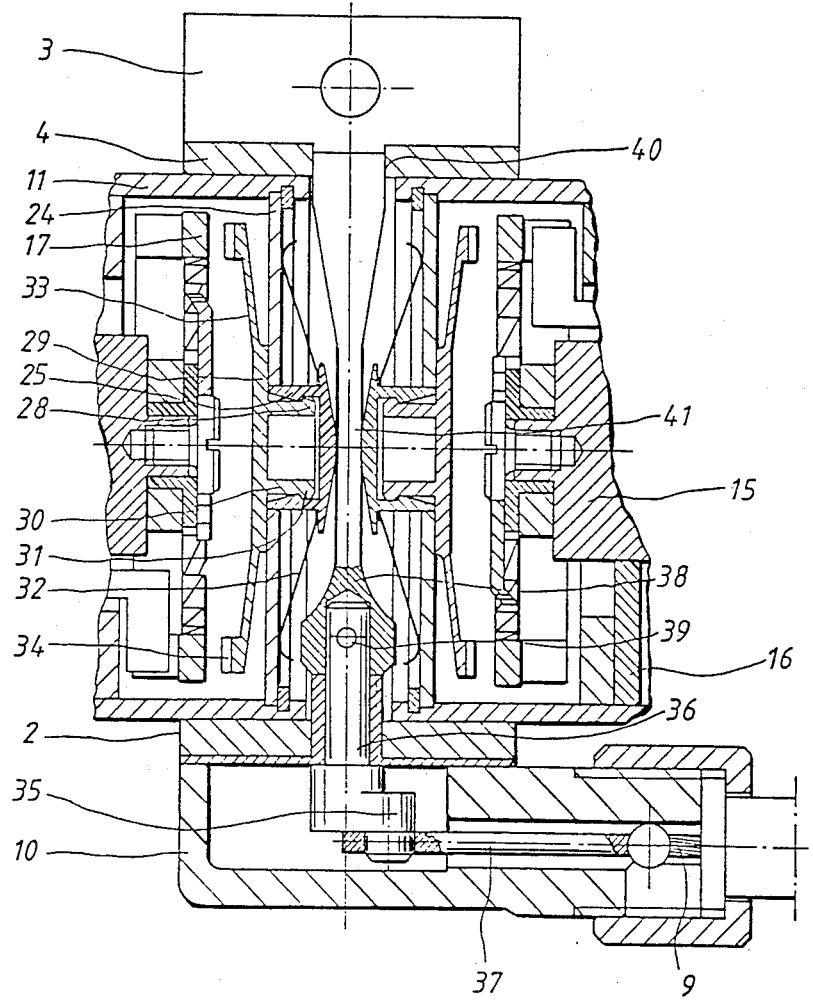
Figure 4:
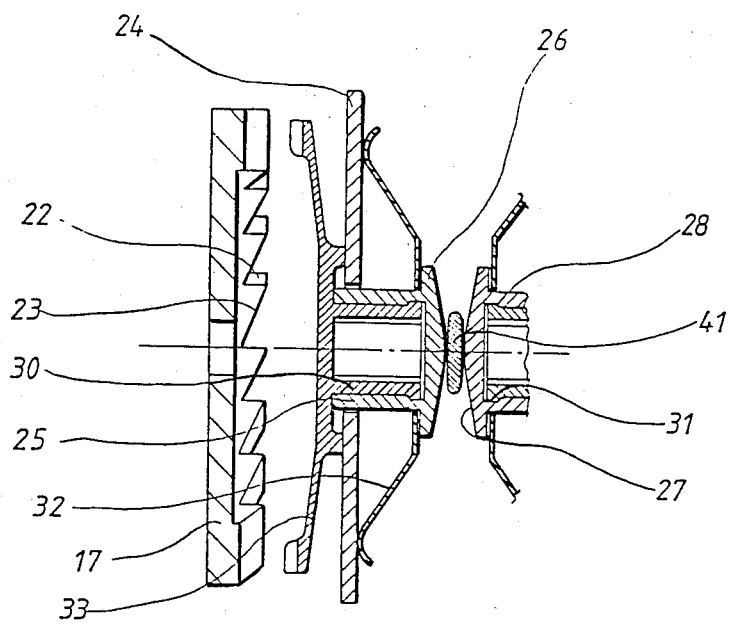
Figure 5:
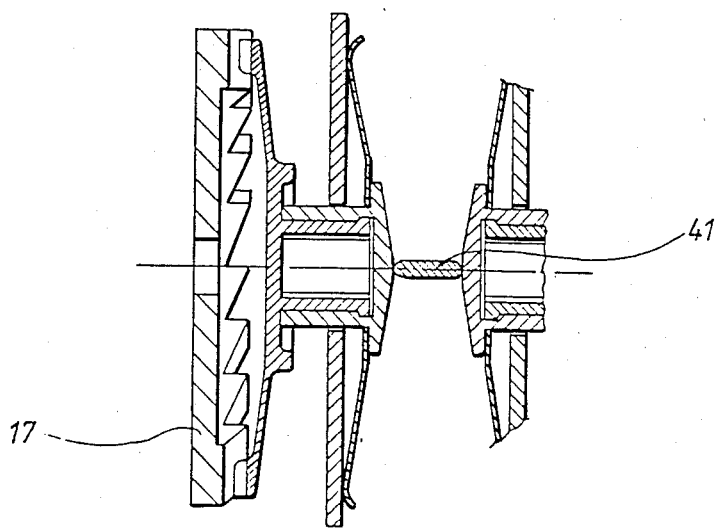
Figure 6:
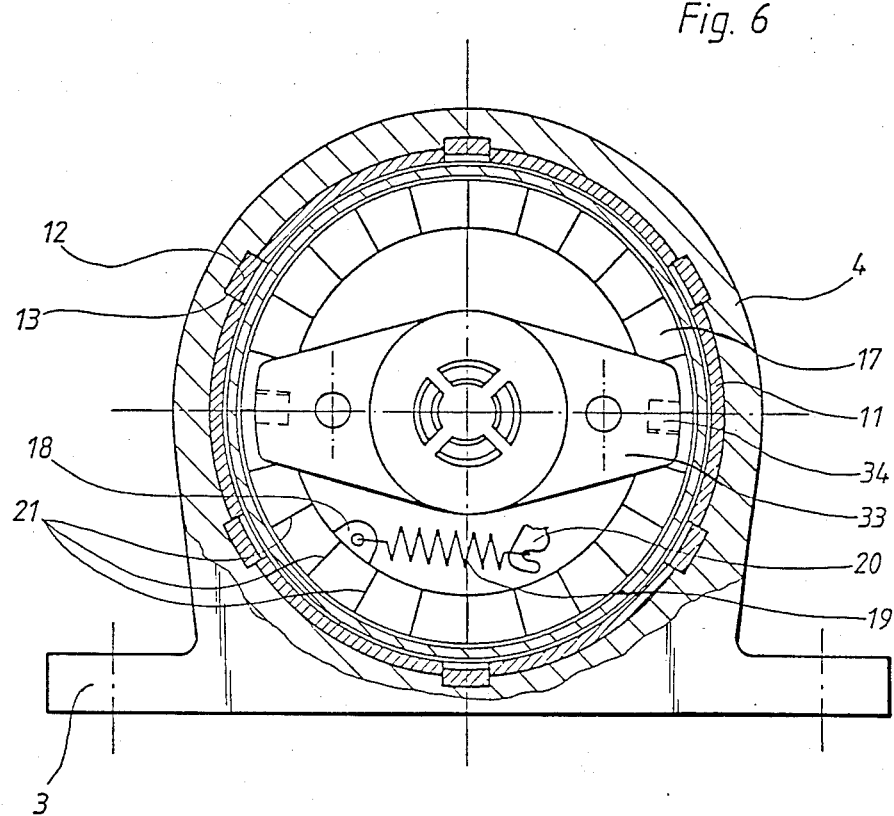
Figure 7:
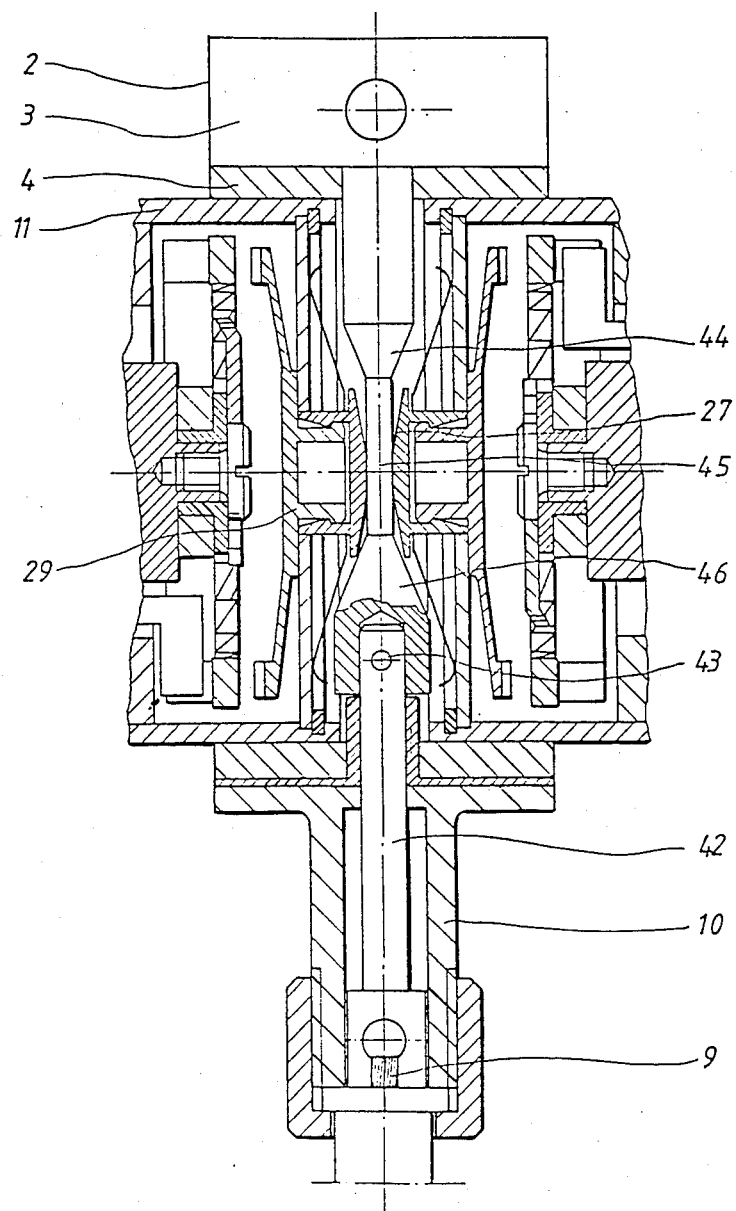
Figure 8:
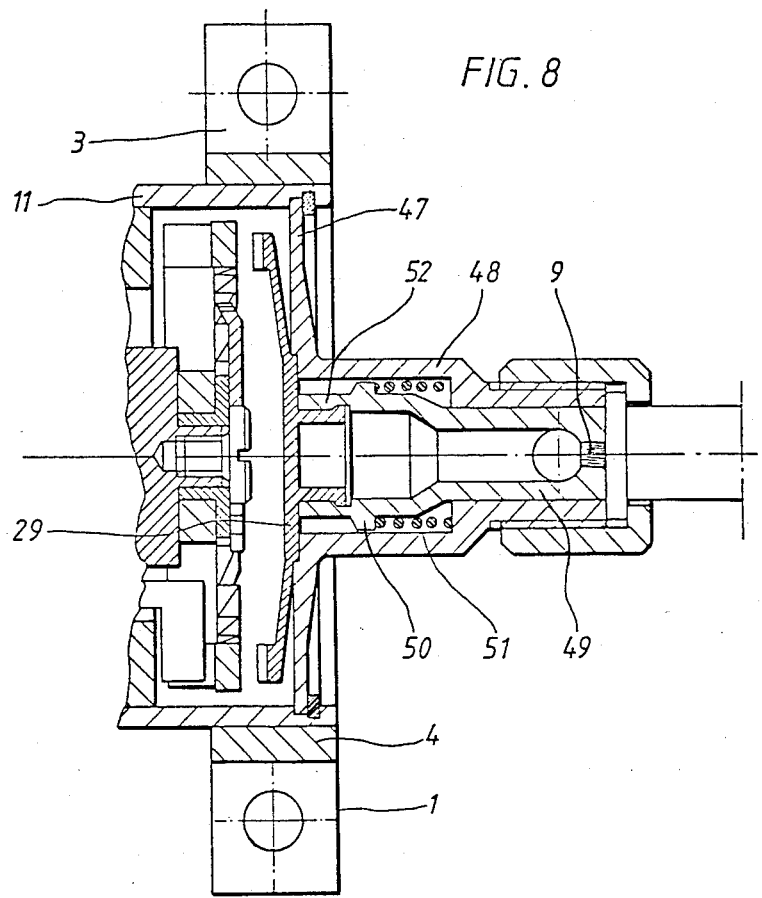

Preferred exemplary embodiments of the invention are explained below with reference to the drawing, wherein:

FIG. 1 shows a paired arrangement of safety belt winding devices in a perspective general view, FIG. 2 shows an individual safety belt winding device in a perspective general view, FIG. 3 shows a partial section through the mutually facing actuation-side ends of the safety belt winding devices according to FIG. 1 in the longitudinal direction of the housing, FIGS. 4 and 5 show a partial illustration of the control member, of the switching member, of the transmission member and of the actuating element in the arrangement according to FIG. 3 in two different switching states, FIG. 6 shows an end elevation of a safety belt winding device according to FIG. 3 and of the switching member provided therein, the end wall being omitted, FIG. 7 shows a sectional view, corresponding to FIG. 3, of an alternative embodiment of the paired arrangement and FIG. 8 shows a partial section through the actuation end of an individual safety belt winding device.

In the arrangement according to FIG. 1 the two safety belt winding devices 5 are fitted fixed in aligned arrangement on a rigid part, not shown, of the vehicle or craft, by means of the housing brackets 1 and 2, which each comprise fastening pediments 3 and an annular part 4, whilst it may be provided that the directional extension 6 of the safety belts 7 is different. The safety belt winding devices are provided with a remotely actuated locking device, which consists externally of the hand lever 8, the bowden cable 9 and the actuating bracket 10 attached to the safety belt winding devices or to their bracket 3. Obviously, an automatic actuation of this device by remotely arranged control devices, not shown, could also replace the manual actuation.

The embodiment according to FIG. 2 differs from that according to FIG. 1 by the individual arrangement of a safety belt winding device and the concentrically aligned arrangement of the actuating bracket 10.

The housing 11 of each safety belt winding device (FIG. 6) exhibits, near the ends, projections 12 stamped along its circumference which have a uniform mutual angular interval. Grooves 13 to accommodate the projections 12 are provided in the corresponding position in the bore of the annular part 4 of the housing brackets 1,2. The housings can therefore be arranged in six different angular positions in the brackets, whilst a modification of the adjustment can be achieved by simple transposition. The housings are fixed in the housing brackets in the axial direction by devices, not shown.

The housings 11 contain coaxially a reel 15 which is mounted rotatably in bearings 16 fixed to the housing and is stressed by the power of a spring, not shown, in such manner that it tends to draw the belt into the housing. Mounted on one end face of the housing, coaxially with the reel 15, is a heavy ring 17 which is entrained by the reel in the case of rotation in the direction of extension through a spring 19 engaging it at 18, the other end of which is connected to the reel at 20 in a manner not shown in detail. When the reel is strongly accelerated in the direction of extending rotation, the ring 17 lags behind the reel due to the influence of its mass and stretching the spring 19, whereby a locking device, not shown, is adjusted to a locked position and the reel becomes blocked relative to the housing. The ring 17 is designated the control member because of this function.

In the reverse direction of rotation the ring 17 is entrained positively by the reel 15 through a stop, not shown. In the state of rest the ring 17 abuts this stop by the influence of the power of the spring 19.

The ring 17 carries at its end face a tooth system 21 with a sawtooth shape—viewed in the circumferential direction—the steep flanks 22 of which point in the rotary direction of extension, whereas the oppositely directed flanks 23 are flatly inclined.

The housing 11 is closed at the end face by a housing plate 24, which contains a median perforation, not circularly limited, through which the transmission member 25 passes with axial sliding mobility but non-rotatably. This is a cap-shaped body with an external surface corresponding to the configuration of the median perforation, with a laterally protruding flange 26 and with an actuating surface 27 which is weakly domed or conical. The bore of the transmission member forms a step 28.

The switching member 29 is connected positively to the transmission member 25, namely by means of an attachment 30 which is formed by a multiply slotted substantially hollow cylindrical part and exhibits a flange 31 which fits and grips behind the step 28. The individual segments of the hollow cylindrical attachment 30 are produced oversize relative to the bore of the transmission member 25 and have resilient properties. On the one hand, this permits the assembly of the switching member and of the transmission member by a simple snap connection. On the other hand, the spring-pretension abutment of the attachment 30 against the bore of the transmission member 25 forms a rotary slip coupling with a predeterminable slip torque.

A leaf spring 32, which engages beneath the flange 26, is braced on the other hand against the housing plate 24 and tends to draw the transmission member 25 and the switching member 29 out of the housing. These parts can be pressed into the housing counter to the power of the spring.

Two spring arms 33, which proceed from the hub of the switching member 29 in diametrically opposite directions, each have at their ends a catch projection 34 which is located opposite the tooth system 21 of the ring 17 and has a flank configuration corresponding to the latter. When the transmission member 25 is pressed into the housing by pressure upon the actuating surface 27, the catch projections 34 move into the tooth system 21 and thereby obstruct its rotary movement in the extension direction. Now when the reel rotates in the extension direction, the ring 17 lags behind the reel, stretching the spring 19, and actuates the locking device. The actuating device is directed to produce this state.

The actuating bracket 10 is connected firmly to the housing bracket 2 in manner not shown. The bowden cable 9 is connected to the actuating bracket 10 in customary manner. A crank 35, which is mounted rotatably in the actuating bracket, has a crank pin 36 which is arranged radially to the housings 11. The crank 35 is engaged by a guide rod 37 which is connected to the end of the bowden cable 9. By actuating the bowden cable by means of the hand lever 8, the crank 35 can be moved into two switching positions offset by approximately 90°. The actuating member 38 is coupled to the pin 36 of the crank 35 integrally in rotation by means of a pin 39, which is rotatable by an opposite end in a bore 40 of the housing bracket. The central part 41 of the actuating member 38 is of flat oval configuration, as may be seen in FIGS. 4 and 5.

When the actuating member 38 occupies the switching position in which it turns its flat sides towards the actuating surfaces 27 of the transmission members 25 present on both sides of it, the switching members 29 occupy the inactive position illustrated in FIGS. 3 and 4. When the actuating member 38 is rotated through 90° by displacement of the bowden cable 9, the state according to FIG. 5 is produced, in which the crosssection of the actuating member is spread relative to the actuating surfaces 27 of the transmission member 25, so that the latter are pressed into the respective associated housings and the switching members 29 occupy the position of engagement.

It is irrelevant to this function, from which side the actuating member 38 extends radially between the actuating surfaces 27.

The exemplary embodiment according to FIG. 7 is identical to that according to FIG. 3 except where otherwise stated below. The actuating bracket 10 is attached to the housing bracket 2 with a radial guiding direction. The bowden cable 9 is connected for direct transmission of compression and traction to a rod 42, which penetrates radially into the interstice between the two housings 11 and is in turn coupled by means of a pin 43 to the actuating member 44, which is constructed as a body of revolution and increases conically in thickness from a thin median part 45 to a larger diameter in the region 46. In the retracted position of the actuating member 44 illustrated, the thin median part 45 cooperates with the actuating surfaces 27 of the transmission members 25. However, when the actuating member 44 is slid forward by means of the bowden cable 9, the conical part 46 slides between the transmission members and spreads them apart, whereby they are slid conjointly with the switching members 29 into the housing in order to produce the locking.

In the exemplary embodiment according to FIG. 8 the end-face housing plate 47 merges integrally in its median part into the actuating bracket 48, which is in turn connected to the bowden cable 9 in a known manner. The latter is connected firmly to a sleeve 49 so that the latter can be slid forwards and backwards by the bowden cable in the axial direction of the housing 11. It has at its housing-side end an external flange 50 which is influenced by a compression spring 51 in such a manner that it is forced towards the housing. This sleeve forms the actuating member in. On the housing side the sleeve 49 merges into the transmission member 52, which is connected to the hub of the switching member 29 firmly in the axial direction and as a slip coupling with predetermined torque in the rotary direction in the snap connection already mentioned. When the sleeve 49 forming the actuating member and the transmission member is slid forwards and backwards by the means of the bowden cable 9, the switching member 29 is slid correspondingly into the locking and release positions.

The moment of friction in the slip coupling between switching member and transmission member is dimensioned in all cases so that it is greater than the torque exerted by the spring 19 (FIG. 6) upon the ring 17 in its control position producing the locking of the locking mechanism.

We claim:

1. In a safety belt winding device provided with a housing enclosing the device, a housing bracket for fastening the housing in a vehicle or craft, a safety belt reel mounted rotatably in the housing, a locking mechanism for locking the reel to prevent rotary movement relative to the housing, a control member connected for conjoint rotation with the safety belt reel adapted to activate the locking mechanism to lock the reel against rotation for unwinding the belt in case of deceleration, a device to independently actuate the locking mechanism including a movable actuating element,
- a transmission member extending into the housing and cooperating with the actuating element for transmitting movements of the actuating element to the interior of the housing, and
- a switching member mounted for movement by the transmission element between first and second positions and adapted to restrain rotation of the control member when it is in the first position and permitting rotation of the control member when it is in the second position,
- the improvement comprising connecting means coaxially and circumferentially adjustable securing the housing to the housing bracket;
- the transmission member being non-rotatably mounted coaxially with the reel and movable in an axial direction between its first and second positions for restraining and permitting rotation of the switching member, means mounting the switching member for rotational movement with the control member when the switching member is in its first position, and
- brake means operatively coupled with the switching member for generating a force resisting rotation of the switching member so that, when the switching member is in its first position, the force is imparted to the control member to thereby cause the control member to activate the locking mechanism.

2. A safety belt winding device according to claim 1, wherein the housing bracket (1,2) comprises an annular portion enclosing the housing and wherein the connecting means secure the housing to the annular portion and comprises a plurality of circumferentially spaced catches and corresponding notches cooperating to fix the housing to the housing bracket in discrete, changeable angular positions.

3. A safety belt winding device according to claim 1, wherein a housing bracket includes means to accommodate the ends of two housings coaxially arranged with respect to each other, and wherein a transmission member extends coaxially in opposite direction into each of the two housings.

4. A safety belt winding device according to claim 1, wherein the portion of the transmission member which operably cooperates with the actuating member is axially symmetrical relative to the housing axis and conical in configuration to slope away from the actuating member.

5. A safety belt winding device according to claim 3, wherein the actuating member (38, 44) is radially oriented and disposed between the transmission member, and including spring means biasing the transmission member out of the respective housings and against the actuating member.

6. A safety belt winding device according to claim 1 including means biasing the transmission member into the housing, and wherein the actuating element includes means for selectively retaining the transmission element retracted against the force exerted by the biasing means so that the switching member is in its first position.

7. A safety belt winding device according to claim 1, wherein the switching member has a catch projection, and the control member has elevations and recesses cooperating therewith.

8. A safety belt winding device according to claim 7, wherein the elevations of the control member includes a steep flank pointing in the direction of rotation unwinding the safety belt from the reel.

9. A safety belt winding device according to claim 7 wherein the elevations of the control member have a flat flank pointing counter to the direction of unwinding rotation and the switching member is axially resiliently yielding.

10. A safety belt winding device according to claim 1, wherein the switching member includes a plurality of radially extending spring arms terminating in circumferentially spaced catch projections adapted to engage and cooperate with the control member when the switching member is in its first position.

11. A safety belt winding device having a housing adapted to be mounted to a vehicle or craft, a reel rotatable mounted within the housing for winding and unwinding the belt, an inertially activated locking mechanism disposed within the housing and operatively coupled with the reel for preventing rotation of the reel in response to an acceleration in the rotational movement of the reel in a direction in which the belt is withdrawn from the reel, the locking mechanism including a control member mounted for rotation with the reel and to be rotationally displaced relative to the reel during reel acceleration to thereby activate the locking mechanism, a movable actuating element disposed exteriorly of the housing for activating the locking mechanism independently of accelerations of the reel, a transmission member extending into the housing and cooperating with the actuating element for transmitting movements of the actuating element to the interior of the housing, a switching member mounted to coaxially rotate with the control member and for movement by the transmission element into and out of engagement with the control member, and brake means cooperating with the switching member for imparting a force to the switching member which retards its rotation so that upon operating the actuating element to engage the switching member and the control member a relative rotational displacement between the reel and the control member takes place and the locking mechanism is activated to prevent a withdrawal of the belt from the reel.

* * * * *